(12) United States Patent
Mozar et al.

(10) Patent No.: US 9,227,792 B2
(45) Date of Patent: Jan. 5, 2016

(54) LONGWALL EQUIPMENT WITH A HYDROSTATIC TUBE BALANCE THEREON FOR DETERMINING THE HEIGHT POSITION OF INDIVIDUAL ELEMENTS OF THE LONGWALL EQUIPMENT

(75) Inventors: Armin Mozar, Hamm (DE); Martin Junker, Essen (DE)

(73) Assignee: RAG Aktiengessellschaft, Herne (DE)

( * ) Notice: Subject to any disclaimer, the term of this patent is extended or adjusted under 35 U.S.C. 154(b) by 289 days.

(21) Appl. No.: 13/977,587

(22) PCT Filed: Dec. 30, 2010

(86) PCT No.: PCT/EP2010/007991
§ 371 (c)(1),
(2), (4) Date: Sep. 12, 2013

(87) PCT Pub. No.: WO2012/089230
PCT Pub. Date: Jul. 5, 2012

(65) Prior Publication Data
US 2014/0097067 A1    Apr. 10, 2014

(51) Int. Cl.
*E21C 35/24* (2006.01)
*E21C 35/08* (2006.01)
*E21D 23/12* (2006.01)
*G01C 5/04* (2006.01)
*B65G 43/00* (2006.01)
*E21D 23/00* (2006.01)

(52) U.S. Cl.
CPC ............... *B65G 43/00* (2013.01); *E21C 35/08* (2013.01); *E21C 35/24* (2013.01); *E21D 23/0039* (2013.01); *E21D 23/12* (2013.01); *G01C 5/04* (2013.01)

(58) Field of Classification Search
CPC .......... E21C 35/24; E21C 35/08; E21D 23/12
USPC ..................... 299/1.6, 1.7; 405/302
See application file for complete search history.

(56) References Cited

U.S. PATENT DOCUMENTS

| 4,218,919 A | * | 8/1980 | Stephenson et al. | ......... 73/865.2 |
| 4,356,639 A | * | 11/1982 | Alarcon Opazo | ............... 33/367 |
| 4,397,099 A | * | 8/1983 | Gaucher et al. | ................. 33/367 |
| 5,001,926 A | * | 3/1991 | Delignieres | ................ 73/170.29 |

FOREIGN PATENT DOCUMENTS

DE          4333032 A1 *   3/1995

* cited by examiner

*Primary Examiner* — David Bagnell
*Assistant Examiner* — Michael Goodwin
(74) *Attorney, Agent, or Firm* — Jennifer S. Stachniak

(57) ABSTRACT

A Longwall equipment for mechanical extraction in longwall mining, in particular in underground coal mining, having a face conveyor arranged along the coal face, having an extraction machine which can be displaced along the face conveyor and having shield support units attached to the face conveyor at an angle thereto, is characterized in that, in order to determine the absolute height position of determined elements of the longwall equipment, a liquid-filled hydrostatic tube balance (17) is installed along the coalface (10) on the selected elements (12, 15, 31) of the longwall equipment and is connected to a base station (19) arranged in one of the gate roads (13, 14) and determined precisely in its height as a reference point, wherein pressure sensors (22) are incorporated into the tube conduit (18, 23, 24) of the hydrostatic tube balance (17), distributed over the course of the longwall equipment on individual elements (12, 15, 31) of the longwall equipment, and are connected to a central evaluation and control unit.

13 Claims, 5 Drawing Sheets

LONGWALL EQUIPMENT WITH A HYDROSTATIC TUBE BALANCE THEREON FOR DETERMINING THE HEIGHT POSITION OF INDIVIDUAL ELEMENTS OF THE LONGWALL EQUIPMENT

BACKGROUND OF THE INVENTION

The instant application should be granted the priority date of Dec. 30, 2010, the filing date of the International patent application PCT/EP2010/007991.

The invention relates to longwall equipment for mechanical extraction in longwall mining, in particular in underground coal mining, with a face conveyor disposed along the coal face, an extraction machine displaceable along the face conveyor and having shield support units fitted to the face conveyor at an angle thereto.

Longwall equipment with the aforementioned features and a method for controlling such longwall equipment are described in WO 2009/103303. In this regard, it is set out in detail in the aforementioned publication that the automation of such a control of longwall equipment is generally dependent on a knowledge of the position of the longwall equipment and its elements in the space, but in particular a knowledge of the height of the face opening existing in each case in the region of the forward end of the top canopy. The determination of the concerned basic values for the calculation of, for example, the face opening height takes place, according to the prior art, via inclination sensors fitted to the main components of the individual shield support units such as floor skids, gob shield, supporting connection rods and top canopy, by means of which sensors the inclination of the respective components with respect to the horizontal is ascertained. By comparing the recorded data with basic data stored in an evaluation unit and defining the geometrical orientation of the components and their movement during advancing, it is possible to calculate the given height perpendicular to the bed of the shield support unit at the forward end of the top canopy, which represents a measure for the height of the face opening.

The known approach is associated with the drawback of costly calculation work, which also requires appropriate acquisition of the basic data applying to the given design of the shield support unit used and the preparation of an applicable algorithm for the calculation of the height perpendicular to the bed.

Apart, from the aforementioned indirect determination of height data, a direct acquisition of height data by means of a hydrostatic tube balance system during the advancing of tunnels is known from DE 43 33 032 C2. Here, there is disposed between the tunnel advancing machine and a reference point a hydrostatic tube balance system, the closed, liquid-filled tube whereof is assigned with one end to the reference height and with the other end to the determination of other magnitudes of the measurement height of the tunnel advancing machine.

The problem underlying the invention is to simplify the determination of height data with generic longwall equipment.

SUMMARY OF THE INVENTION

In its basic idea, the invention makes provision such that, in order to determine the absolute height position of determined elements of the longwall equipment, a liquid-filled hydrostatic tube balance is installed along the coalface on the selected elements of the longwall equipment and is connected to a base station disposed in one of the gate roads and determined precisely in its height as a reference point, wherein pressure sensors are incorporated into the tube conduit of the hydrostatic tube balance, distributed over the course of the longwall equipment on individual elements of the longwall equipment, and are connected to a central evaluation and control unit. The invention is associated with the advantage that direct height data can be acquired by means of the hydrostatic tube balance installed on the longwall equipment along the coalface and can also be assigned directly to individual points of the course of the coalface via the pressure sensors disposed at suitably selected intervals. The pressure difference can be ascertained from the pressure difference to be ascertained in each case between the reference pressure determined at the base station and the absolute pressure detected at the face by the given local pressure sensor and can be used to determine corresponding height data. Through the derivation of a plurality of height data ascertained over the course of the face, a height profile can be ascertained for the elements of the longwall equipment to which the respective hydrostatic tube balance is assigned.

Inasmuch as, according to examples of embodiment of the invention, individual hydrostatic tube balances or a hydrostatic tube balance system can be installed on the top canopies and/or the floor skids of the employed shield support units and/or on the face conveyor and can also be connected to the extraction machine, the absolute height positions of the aforementioned elements of the longwall equipment can be directly ascertained, so that an important basic pre-requisite for the automated control of longwall operations is met. Inasmuch as the inclination sensors already known in the prior art as absolute angle measuring-instruments and an extraction progress measurement of shield support units, face conveyor and extraction machine based on a standard advancing cylinder path measurement are retained, it is possible on the basis of these detection systems to detect continuously in space the absolute coordinates and the absolute position of the individual elements of the longwall equipment. Together with the known design dimensions of the individual elements, it is thus possible, for example, to assess collision problems between the top canopies of the shield support units and the extraction machine travelling along the coalface or to avoid corresponding collisions.

In detail, provision is made according to an example of embodiment of the invention such that the tube conduit of the hydrostatic tube balance is installed on the top canopies of the shield support units and a pressure sensor is assigned in each case to individual shield support units. The tube conduit of an assigned hydrostatic tube balance can be installed in the forward region or in the middle region of the top canopies of the shield support units.

According to an example of embodiment of the invention, provision can further be made such that the tube conduit of the hydrostatic tube balance is installed on the skids of the shield support units and a pressure sensor is assigned in each case to individual shield support units; provision can also be made such that the tube conduit of the hydrostatic tube balance is installed on the chutes, that is, the conveyor troughs, of the face conveyor and a pressure sensor is assigned in each case to individual chute lengths, that is, individual conveyor trough pans, spaced apart from one another, and further that the extraction machine displaceable along the coalface is connected to a tube conduit of the hydrostatic tube balance connected to the base station and at least one pressure sensor is disposed on the extraction machine.

In particular, inasmuch as corresponding hydrostatic tube balances are installed in each case on all the elements of the longwall equipment, i.e. top canopies, skids, face conveyor and extraction machine, it is possible to prepare a height profile respectively for the position of the shield support units and the position of the face conveyor with the extraction machine guided thereon, so that conclusions can be drawn therefrom as to the behaviour of the longwall equipment during the extraction operation.

If, especially in the case of hydrostatic tube balances installed on a plurality of elements of the longwall equipment, corresponding hydrostatic tube balance systems are formed, provision can be made according to an example of embodiment of the invention such that a plurality of individual hydrostatic tube balances with associated tube conduits and pressure sensors disposed therein are disposed separately on the elements of the longwall equipment.

In an alternative embodiment of the invention, provision can be made such that a central supply line is led from the base station to the face-to-roadway transition, from which supply line at least two tube conduits installed on different components of the longwall equipment proceed, which are connected to one another in the region of the opposite gate road, and such that the pressure sensors incorporated in the different tube conduits in each case have the same distance from the face-to-roadway transition.

With regard to the constitution of the hydrostatic tube balance or the hydrostatic tube balance system, provision is made according to an example of embodiment of the invention such that a tube conduit section of the hydrostatic tube balance is installed in the gate road lying opposite the gate road accommodating the base station.

In a first embodiment of the invention, provision can be made such that a pressure control valve is disposed at the end of the tube conduit section and to this extent the tube conduit is closed, so that, with the inclusion of the base station, a pressurised hydrostatic tube balance closed at both ends results. The pressure control valve can also be used as a drain for air and water for the venting and filling of the hydrostatic tube balance during the tube filling from the base station. The advantage of the hydrostatic tube balance closed, at both ends essentially consists in the fact that the measurements can take place independently of the height course of the system without changing the measurement set-up, since for example the base station can lie lower than the end tube conduit section without the measurement operation being disturbed. Further advantages of the closed hydrostatic tube balance consist in the fact that a barometric correction is not required, and that, on account of the raised pressure level in the tube conduit system, outgassing-related density changes of the liquid (dissolved air for example) play a reduced and therefore negligible role. A drawback with the closed hydrostatic tube balance consists, for example, in the fact that the liquid contained in the system is completely confined. Consequently, the pressure level can change on account of squeezing or temperature changes of the tube and also of the liquid. The height determination therefore has to be related to or calculated for changes in the basic pressure at the reference point at the lowest point of the hydrostatic tube balance. The reference pressure is measured overall at a higher pressure level, which has a tendency to give rise to reduced basic accuracies in the case of pressure sensors with identical percentage accuracy. Moreover, a higher sensitivity to dynamic influences such as mechanical vibrations is found, because the damping of the system is reduced due to the confinement of the liquid.

According to an alternative example of embodiment of the invention, provision is therefore made such that an overflow basin forming the highest point of the hydrostatic tube balance is disposed at the end of the tube conduit section installed in the assigned gate road in order to form a tube conduit instrument open at one end, so that a hydrostatic tube balance open at one end results. The advantages of such a hydrostatic tube balance open at one end consist in the fact that a straightforward hydraulic pressure/height determination is provided, wherein the ascertained absolute pressures can always be related to the pressure measured at the base station. An influence on the measurement by squeezing of the tube or temperature-induced internal pressure changes is ruled out, and there is also only a slight sensitivity to dynamic influences in the form of mechanical vibrations. A drawback is that a barometric correction is required for precision measurements. Moreover, layout problems may arise, since the open end of the hydrostatic tube balance with the overflow basin must always lie at the highest point. In the presence of changing conditions which cannot be ruled out in underground mining operations, this may give rise to the need for modification measures. Particularly in the case of changing overall heights, an overflow of the hydrostatic tube balance or refilling must be ensured in order to achieve a correct operation of the hydrostatic tube balance.

In this regard, provision is made according to an example of embodiment of the invention such that the base station is disposed in the, at the time, lower-lying gate road.

Furthermore, it is expedient if the pressure sensor of the hydrostatic tube balance lying closest to the overflow basin is disposed at a defined height below the overflow basin.

Accordingly, provision can be made such that a connection for the filling of the hydrostatic tube balance with liquid is disposed at the base station.

With regard to a barometric correction of the measured values ascertained by the pressure sensors, provision can be made such that an air line is installed parallel to the tube conduit of the hydrostatic tube balance, to which air line the pressure sensors disposed in the tube conduits of the hydrostatic tube balance are connected.

BRIEF DESCRIPTION OF THE DRAWINGS

Examples of embodiment of the invention are reproduced in the drawing, said examples being described below. In the figures.

DETAILED DESCRIPTION OF THE PREFERRED EMBODIMENTS

Figure 1:
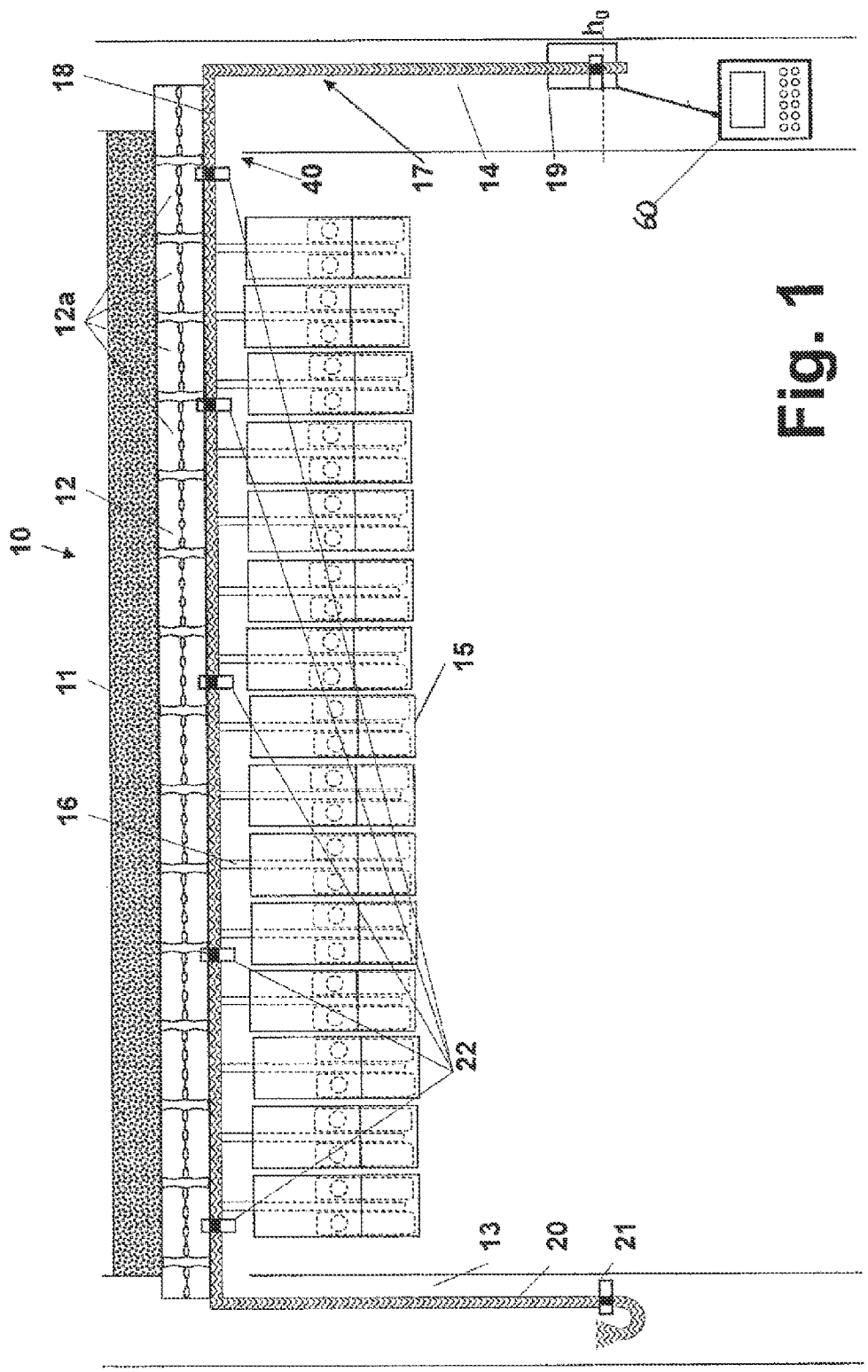
FIG. 1 shows a face with installed longwall equipment and a hydrostatic tube balance open at one end installed on the face conveyor in a diagrammatic representation.

Inasmuch as a mining situation in underground coalmining is represented diagrammatically in FIG. 1, coalface 10 at a seam 11 runs between two gate roads, whereof the gate road on the left in FIG. 1 is referred to as head gate 13 and the gate road correspondingly on the right is referred to as main gate 14. A face conveyor 12 is arranged between head gate 13 and main gate 14 along coalface 10, on which face conveyor an extraction machine (not represented here) is guided (see FIG. 5). A shearer loader travelling on face conveyor 12 or also a plough guided on face conveyor 12 come into consideration as extraction machines. Lying opposite seam 11, shield support elements 15 are fitted to face conveyor 12 via advancing cylinder 16, the structure of said shield support units also emerging in greater detail from FIG. 5. A corresponding mining situation including the elements of the longwall equipment, such as, for example conveyor troughs 12a and conveyor trough pans, is generally known and familiar to the person skilled in the art.

In order to ascertain a height profile of the course of the coalface and the position of the elements of the longwall equipment in space on the basis of absolute height data, an electronic hydrostatic tube balance 17 with a tube conduit 18 installed on face conveyor 12 is arranged in the example of embodiment represented in FIG. 1. Tube conduit 18 is led at face-to-roadway transition 40 out of the face into main gate 14, and is connected to a base station 19 set up in main gate 14. On the opposite side, tube conduit 18 installed on face conveyor 12 transforms into tube conduit section 20 installed in head gate 13. Pressure sensors 22 spaced apart from one another and thus assigned to individual shield support units 15 are incorporated in tube conduit 18, an end pressure sensor 21 also being disposed at the end of tube conduit section 20 installed in head gate 13.

The specification incorporates by reference the disclosure of International application PCT/EP2010/007991, filed Dec. 30, 2010.

The present invention is, of course, in no way restricted to the specific disclosure of the specification and drawings, but also encompasses any modifications within the scope of the appended claims.

Inasmuch as the example of embodiment represented in FIG. 1 concerns an electronic hydrostatic tube balance open at one end, base station 19 has to be disposed at the lowest point of hydrostatic tube balance 17. Inasmuch as an up-dig attack with an incline of coalface 10 from head gate 13 to main gate 14 is normally sought in underground mining operations, base station 19 is accordingly disposed in main gate 14 in the example of embodiment represented, and to be precise with a spacing from coalface 10 which is such that marked convergence effects in the roadway region are no longer to be expected. Current operational initial height $h_0$ has to be measured with suitable accuracy at base station 19, regular control measurements of initial height $h_0$ having to be carried out at base station 19 in order to guarantee the accuracy of the ongoing measurements.

As represented, a pressure sensor 22 for measuring the absolute pressure prevailing in tube conduit 18 at the point in question can be installed at every n-th shield support unit 15, said pressure sensor transmitting data via shield controls fitted on shield support unit 15 or via another data transmission system to a central evaluation and control unit 60. The height differential and the absolute height of local pressure sensor 22 can be determined from the pressure difference between the reference pressure measured at base station 19 and the pressure measured by the respective local pressure sensor in coalface 10. These values can be recorded in the evaluation and control unit 60 for each pressure sensor 22 and, as part of the mining progress measurement, for each new sensor coordinate and can be used to derive a height profile to be installed over coalface 10.

Since, with appropriate installation of a plurality of electronic hydrostatic tube balances 17 on the individual elements of the longwall equipment, the height position at the individual elements of the longwall equipment can also be ascertained, it is also possible via the direct height measurement to establish distances between the individual elements of the longwall equipment. For this purpose, a hydrostatic tube balance system comprising electronic hydrostatic tube balances 17 can be formed, as is represented diagrammatically in FIG. 2, again with the electronic hydrostatic tube balances open at one end. In addition to tube conduit 18 installed on face conveyor 12 according to FIG. 1, a further tube conduit 23 is installed on the skids of shield support units 15 and a further tube conduit 24 on the top canopies of shield support units 15 according to FIG. 2. All three tube conduits 18, 23, 24 are connected to a common supply line 25, which connects tube conduits 18, 23, 24 to base station 19 set up in main gate 14. Similarly, in the region of head gate 13, tube conduits 18, 23, 24 are connected to tube conduit section 20 installed in head gate 13, said tube conduit section, corresponding to the embodiment of the hydrostatic tube balances open at one end represented in FIGS. 1 and 2, being led to an overflow basin 26 set up in head gate 13.

Inasmuch as the function of the hydrostatic tube balance technique requires a continuous water column in the tube conduit of the hydrostatic tube balance without air inclusions, a liquid feed-in has to be designed that precisely guarantees this. The filling of the hydrostatic tube balance line should therefore take place from the lowest point, i.e. from base station 19 in the case represented in the example of embodiment. An overflow siphon with an open discharge should be positioned at the highest point of the hydrostatic tube balance, in the represented examples of embodiment in the region of overflow basin 26. In order to monitor the complete filling and the filling procedures, last pressure sensor 21 at the end of the measurement chain formed by pressure sensors 22 and 21 should be integrated at a defined height below the overflow siphon (overflow basin 26). Thus, if the correct height is displayed (as a pressure signal) in the region of overflow basin 26, the hydrostatic tube balance system is completely filled. If complete filling has not been carried out, it is possible, for example with the arrangement of an electromagnetic valve in the region of base station 19, for automatic filling to be triggered until the desired liquid column is present in the region of overflow basin 26. Furthermore, the use of so-called tube pigs can be considered, by means of which air bubbles can also be reliably removed from a tube system.

The advantage of the use of the hydrostatic tube balance open at one end as described above consists, in the first place, in that it is a simple hydrostatic pressure or height determination, wherein the absolute pressures measured by pressure sensors 22 can always be related to the pressure prevailing at base station 19. There is no influence on the measurement due to squeezing of the tube or due to temperature-induced internal pressure changes, and finally there is a low sensitivity to dynamic influences, for example in the form of mechanical vibrations. As is represented, an automatic and controlled filling of the hydrostatic tube balance open at one end is possible. The drawbacks consist in the fact that a barometric correction is required for precision measurements. Arrangement problems of the hydrostatic tube balance open at one end can arise in the mining operation, since the open end of hydrostatic tube balance 17 must always lie at the highest point; in the case of a changing seam stratification or changing mining conditions, this may require corresponding modification measures. In the case of changing overall heights, therefore, the overflow or the refilling of the hydrostatic tube balance must be ensured.

When electronic hydrostatic tube balances are used according to the invention, use should generally be made of precision pressure sensors with an absolute accuracy of at least 0.01 bar and an operating performance that is stable in the long term. Adherence to an exact zero point as well as a very good linearity are required. Since this can only be guaranteed by means of an internal temperature compensation, the temperature of the liquid present in the tube conduit of the hydrostatic tube balance should also be detected and transmitted to the evaluation and control unit, so that temperature-related pressure changes of the liquid column can be compensated for section by section. A physical (hydraulic) and electronic damping of the measurement data is also advisable in order to smooth the measurement data despite the vibrations occurring in the mining operation with the running face conveyor and the extract ion machine passing by.

In order to ensure the desired accuracy, pressure sensors 22 and 21 used on an electronic hydrostatic tube balance should be able to be calibrated by the use of a high-precision reference sensor, wherein the reference sensor should be connected at the same height to the respective pressure sensor. For the calibration, both sensors must be temporarily switched to a pressureless state by means of suitable slide valves. The pressure sensor to be tested must then be calibrated exactly to the zero point by electronic setting of the zero point. The hydrostatic tube balance is then again slid onto the hydraulic passage, and the pressure sensor to be tested must learn the current absolute pressure from the reference sensor. With such a two-point calibration, all pressure sensors 22 and 21 used as part of hydrostatic tube balance 17 receive a correlated display characteristic. It can thus be ensured that, even in the case of small height differences, the height positions of the elements of the longwall equipment can be exactly determined by comparing the absolute pressures.

In order to compensate for air pressure influences caused by ventilation of the mine workings, a second small air tube to which all pressure sensors 22 and 21 are connected can be installed with tube conduits 18, 23, 24 of hydrostatic tube balance 17. The measurement of a pressure differential of the liquid column against the local air pressure corresponding to the ventilation conditions is thus possible, so that the given air pressure influence can be physically compensated for.

Figure 2:
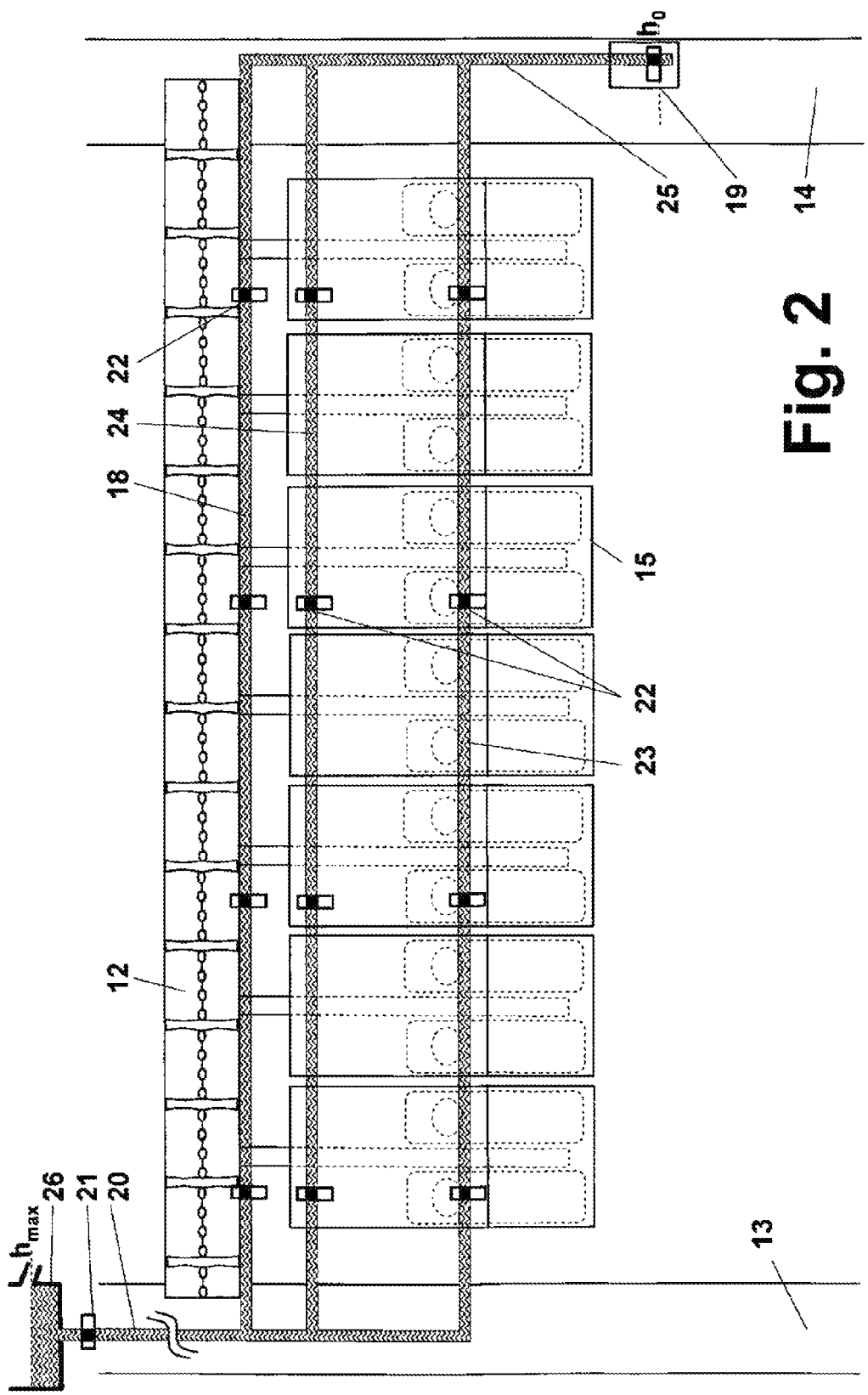
FIG. 2 shows a hydrostatic tube balance system of hydrostatic tube balances open at one end for use with longwall equipment according to FIG. 1 in a diagrammatic representation.
Figure 3:
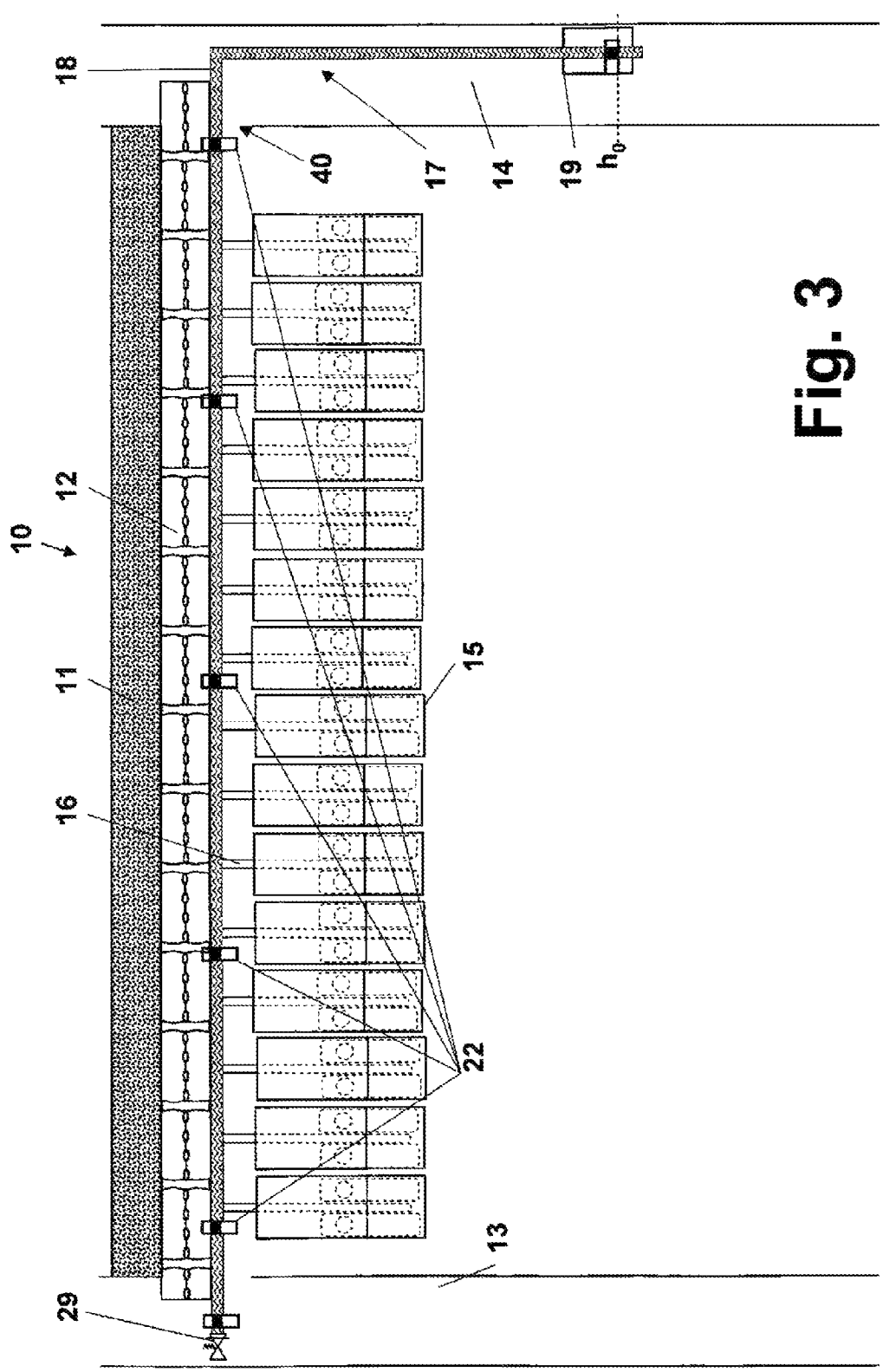
FIG. 3 shows the face according to FIG. 1 with a hydrostatic tube balance closed at both ends.
Figure 4:
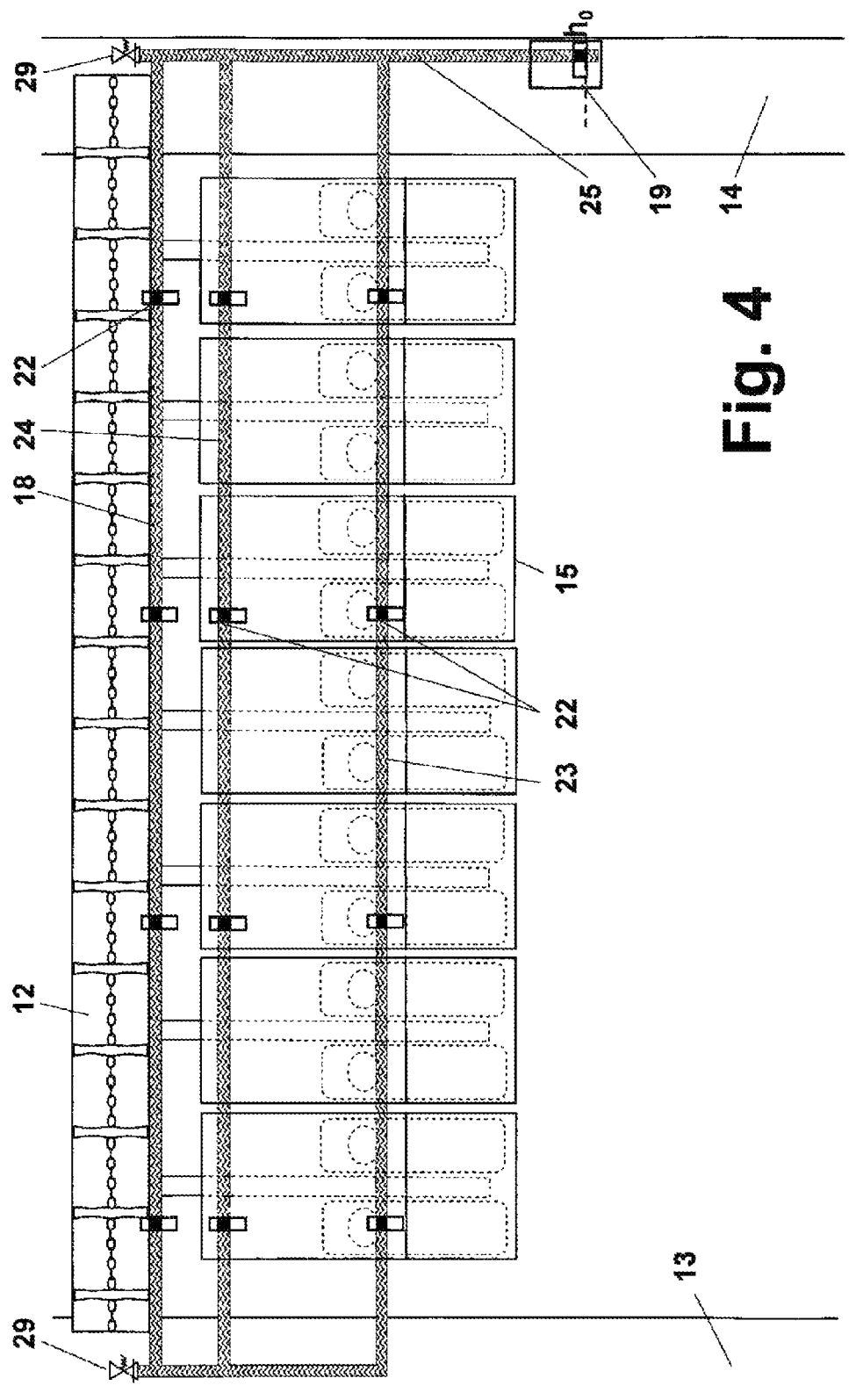
FIG. 4 shows a hydrostatic tube balance system with hydrostatic tube balances closed at both ends according to FIG. 2 in use with longwall equipment according to FIG. 3.

The example of embodiment represented in FIGS. 3 and 4 corresponding to that in FIGS. 1 and 2 differs from the previously described examples of embodiment in that a hydrostatic tube balance 17 closed at both ends is used, which at its end lying in head gate 13 is closed by means of a pressure control valve 29 provided with an open discharge. This pressure control valve 29 serves as a drain for air and liquid for venting and filling during the filling of tube conduit 18 from base station 19 disposed in main gate 14. If the pressure level in the closed tube system falls below a limiting value, automatic refilling can take place. The advantage of the use of an electronic hydrostatic tube balance closed at both ends consists in the fact that the measurements can take place independently of the course of the height without changes in the measurement set-up. Thus, for example, the end of tube conduit 18 lying in head gate 13 can now lie lower than base station 19 lying in main gate 14 without the measurement procedure being disturbed. The height differential and the absolute height of each pressure sensor 22 at coalface 10 can be ascertained from the pressure difference between the pressure ascertained, by the given local pressure sensor 22 and the pressure measured at base station 19, as is described for the hydrostatic tube balance open at one end.

The drawback of a hydrostatic tube balance system with hydrostatic tube balances 17 closed at both ends lies in the fact that the pressure level inside hydrostatic tube balances 17 can change due to squeezing or temperature changes of the hose material and of the liquid. There is also a higher sensitivity to dynamic influences in the form of mechanical vibrations, since the damping is reduced by the confinement of the liquid.

As emerges from FIG. 4, the use of a plurality of measurement lines is possible within a hydrostatic tube balance system with a tube conduit 18 installed on face conveyor 12 and with a tube conduit 23 installed on the skids of shield support units 15 and with a tube conduit 24 installed on the top canopies of shield support units 15.

Figure 5:
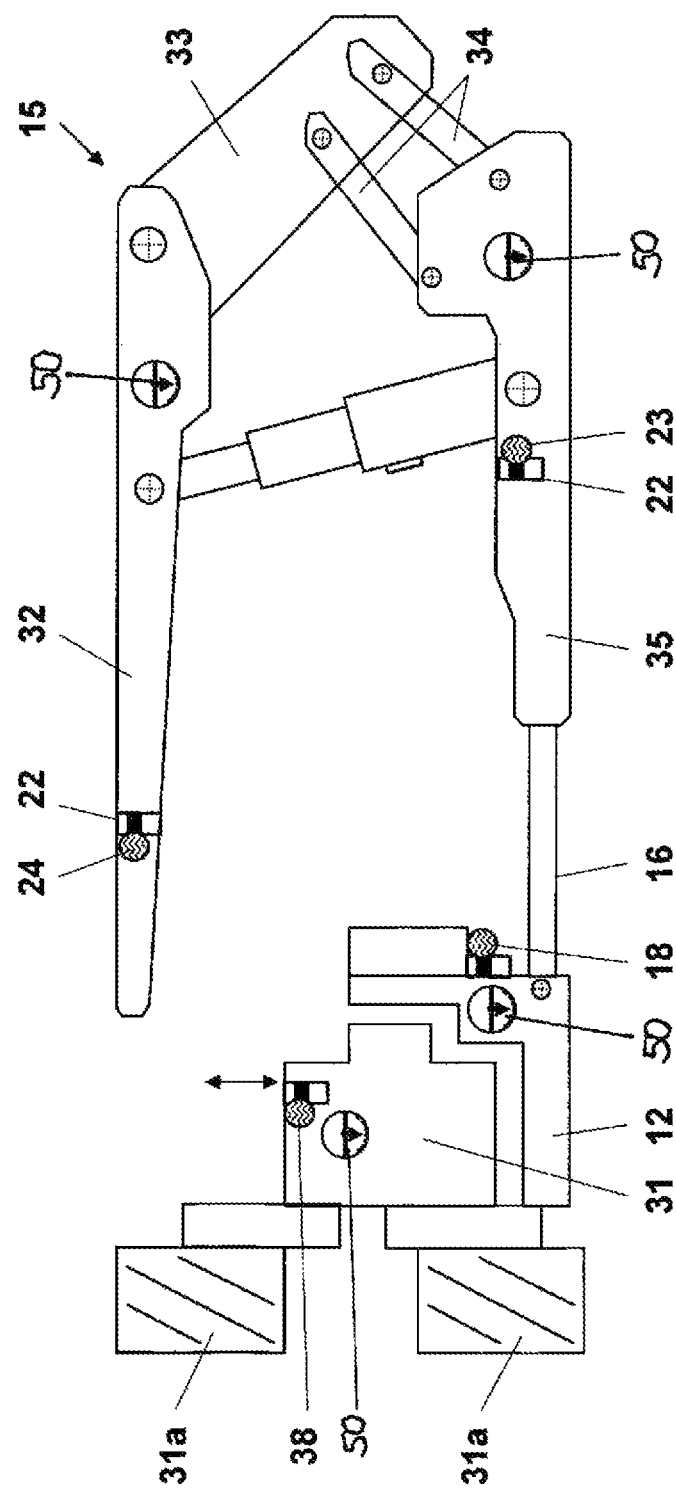
FIG. 5 shows longwall equipment related to a shield support unit represented in side view with hydrostatic tube balances installed thereon.

The embodiment of such a hydrostatic tube balance system in the context of longwall equipment can again be seen from FIG. 5. Shield support units 15 represented only diagrammatically in FIGS. 1 to 4 comprise in detail a top canopy 32, a gob shield 33, supporting connection rods 34 and a skid 35, each shield support unit 15 being connected to face conveyor 12 by means of advancing cylinder 16. In the example of embodiment represented, the extraction machine comprises a shearer loader 31 with cutting drums 31a. Such a structure of the longwall equipment is known in the prior art.

It can be seen from FIG. 5 that tube conduits 18 and 23 and 24 are installed respectively on face conveyor 12, skids 35 and top canopies 32 of shield support units 15, tube conduit 24 being Installed at the forward end of top canopies 32 in the example of embodiment represented. In addition, shearer loader 31 is also connected, via a tube conduit connected thereto, to a pressure sensor 38 disposed on shearer loader 31 at base station 19, so that the determination of the height position of shearer loader 31 is also possible. With such an arrangement, therefore, it is possible to draw conclusions about the height of the face opening in the region of the forward ends of top canopies 32 from a comparison of the height of top canopies 32 with the position of skids 35 or face conveyor 12, and in turn, from a knowledge of the height position of shearer loader 31 relative to the forward end of top canopy 32, it is possible to draw conclusions concerning possible collisions between shearer loader 31 and shield support units 15.

As further emerges from FIG. 5, inclination sensors 50, which can also be used to determine height data, are in each case disposed, in a manner known from the prior art, on the components of shield support units 15, i.e. on top canopy 32 and skid 35 as well as on face conveyor 12 and on extraction machine 31.

Overall, the measured height data can be used in diverse ways for the automated control of longwall operations.

The features of the subject-matter of these documents disclosed in the above description, the claims, the abstract and the drawing may be essential both individually and also in any combinations with one another for the implementation of the invention in its various embodiments.

The invention claimed is:

1. A longwall equipment for mechanical extraction in longwall mining, comprising:
 a face conveyor arranged along a coal face;
 an extraction machine displaceable along the face conveyor and having shield support units attached to the face conveyor at an angle thereto;
 a liquid-filled hydrostatic tube balance with a tube conduit, said liquid-filled hydrostatic tube balance positioned along the coal face on selected elements of the longwall equipment for determining an absolute height position of the selected elements of the longwall equipment, wherein said hydrostatic tube balance is connected to a base station arranged in a gate road and determined precisely in its height as a reference point;

pressure sensors incorporated into the tube conduit and distributed over a course of the longwall equipment on the selected elements of the longwall equipment; and a central evaluation and control unit, wherein said pressure sensors are connected to the central evaluation and control unit.

2. The longwall equipment according to claim 1, wherein the tube conduit is positioned on top canopies of said shield support units, wherein one of said pressure sensors is assigned to a respective shield support unit.

3. The longwall equipment according to claim 1, wherein the hydrostatic tube balance is arranged on skids of the shield support units, and wherein one of said pressure sensors is assigned to a respective shield support unit.

4. The longwall equipment according to claim 1, wherein the tube conduit of the hydrostatic tube balance is arranged on conveyor troughs of the face conveyor, and wherein one of said pressure sensors is assigned to individual conveyor trough pans spaced apart from one another.

5. The longwall equipment according to claim 1, wherein the extraction machine is connected to the tube conduit of the hydrostatic tube balance, wherein said tube conduit is connected to the base station, and wherein at least one of said pressure sensors is arranged on the extraction machine.

6. The longwall equipment according to claim 1, wherein a plurality of individual hydrostatic tube balances with associated tube conduits and pressure sensors arranged therein are disposed on the selected elements of the longwall equipment.

7. The longwall equipment according to claim 1, wherein a supply line is led from the base station to a face-to-roadway transition, wherein at least two tube conduits installed on different ones of said selected components lead away from said supply line, wherein said at least two tube conduits are connected to one another in a region of an opposite gate road, wherein the pressure sensors incorporated in the at least two tube conduits each have the same distance from the face-to-roadway transition.

8. The longwall equipment according to claim 1, wherein a tube conduit section of the hydrostatic tube balance is installed in a gate road that lies opposite to the gate road accommodating the base station.

9. The longwall equipment according to claim 8, wherein a pressure control valve is arranged at an end of the tube conduit section for formation of a pressurized hydrostatic tube balance closed at both ends.

10. The longwall equipment according to claim 8, wherein an overflow basin forming a highest point of the hydrostatic tube balance is arranged at an end of the tube conduit section in order to form a hydrostatic tube balance open at one end.

11. The longwall equipment according to claim 10, wherein the base station is arranged in a lower-lying gate road.

12. The longwall equipment according to claim 10, wherein one of the pressure sensors of the hydrostatic tube balance that lies closest to the overflow basin is disposed at a defined height below the overflow basin.

13. The longwall equipment according to claim 1, wherein a connection for filling of the hydrostatic tube balance with liquid is disposed at the base station.

* * * * *